(12) United States Patent
Yoshii et al.

(10) Patent No.: US 6,182,741 B1
(45) Date of Patent: *Feb. 6, 2001

(54) AIR CONDITIONER FOR PREVENTING CORROSION OF EVAPORATOR

(75) Inventors: Keiichi Yoshii, Anjo; Sadayuki Kamiya, Kariya, both of (JP)

(73) Assignee: Denso Corporation, Kariya (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/030,586

(22) Filed: Feb. 25, 1998

(30) Foreign Application Priority Data

Feb. 26, 1997 (JP) ............................................ 9-042635

(51) Int. Cl.⁷ .............................................. B60H 1/32
(52) U.S. Cl. .................. 165/41; 165/42; 165/43; 165/134.1; 62/244; 62/303; 62/317; 454/147; 454/148; 454/156
(58) Field of Search ............................ 165/41, 42, 43, 165/134.1; 62/244, 303, 317; 454/156, 159, 160, 161, 147, 148

(56) References Cited

U.S. PATENT DOCUMENTS

| | | | |
|---|---|---|---|
| 2,235,642 | * | 3/1941 | Lintern et al. .................. 454/161 |
| 3,170,509 | * | 2/1965 | De Rees et al. .................. 454/161 |
| 5,819,841 | * | 10/1998 | Moynat .................. 165/78 |

FOREIGN PATENT DOCUMENTS

| | | | |
|---|---|---|---|
| 2532739 | * | 3/1984 | (FR) .................. 454/161 |
| 0167317 | * | 9/1984 | (JP) .................. 454/156 |
| 0055596 | * | 3/1986 | (JP) .................. 165/153 |
| 62-197412 | | 12/1987 | (JP) . |
| 0116924 | * | 5/1988 | (JP) .................. 454/159 |
| 2-225122 | | 9/1990 | (JP) . |

* cited by examiner

Primary Examiner—John K. Ford
(74) Attorney, Agent, or Firm—Harness, Dickey & Pierce, PLC

(57) ABSTRACT

An air conditioner includes a case accommodating an evaporator having a core portion and a lower tan disposed at a bottom of the core portion. The case has a recess portion disposed at an upstream air side of the evaporator, and a covering wall is formed to extend upwardly from the bottom of the recess portion to cover only the lower tank at an immediately upstream air side. When air passes through the evaporator, alien substances contained in air collide with the evaporator and fall to be deposited in the recess portion. Therefore, the deposition of the alien substances do not directly adhere to the lower tank of the evaporator to prevent the evaporator from being corroded.

11 Claims, 4 Drawing Sheets

AIR CONDITIONER FOR PREVENTING CORROSION OF EVAPORATOR

CROSS-REFERENCE TO RELATED APPLICATION

This application is related to and claims priority from Japanese Patent Application No. Hei. 9-42635 filed on Feb. 26, 1997, the contents of which are hereby incorporated by reference.

BACKGROUND OF THE INVENTION

1. Field of the Invention

The present invention relates to an air conditioner for preventing an evaporator from being corroded.

2. Description of Related Art

As shown in FIG. 5, a conventional automotive air conditioner includes an evaporator 2 made of aluminum and a case 7 made of resin. The evaporator 2 is accommodated within the case 7 so that a core portion 21 of the evaporator 2 is placed in a substantially vertical direction in FIG. 5. Air passes through substantially horizontally between fins of the core portion 21 of the evaporator 2.

Within air passing through the evaporator 2, some alien substances such as dirt and dust are contained. After using the air conditioner for a long time, the alien substances are deposited around the lower portion of the evaporator 2 and forms the deposition A of the alien substances as shown in FIG. 5. As a result, the deposited alien substances may adhere to aluminum tubes of the evaporator 2 and the tubes may be corroded by the deposited alien substances. This may cause serious problems such as refrigerant leakage from the evaporator 2.

SUMMARY OF THE INVENTION

In view of the above-mentioned problem, it is an object of the present invention to provide an air conditioner having an evaporator to which alien substances do not directly adhere to prevent the evaporator from being corroded.

According to the present invention, an air conditioner includes a case for accommodating an evaporator and a wall member for covering a tank of the evaporator at an immediately upstream air side of the tank. The tank is disposed at a lower side of the evaporator. Therefore, it prevents alien substances such as dirt and dust contained in air from directly adhering to the tank of the evaporator. Further, by providing the wall member, it can prevent air from flowing through a clearance between a bottom of the tank and the case. Thus, a cooling ability of the air conditioner can be improved.

Preferably, the case includes a recess portion at an immediately upstream air side of the wall member, the recess portion is opened upwardly to have a bottom portion, and the wall member is disposed to extend from the bottom portion of the recess portion to only cover the tank. Therefore, the alien substances are deposited in the recess portion to prevent the alien substances from being mixed into air again. Further, because the wall member only covers the tank, the cooling capacity is not decreased by providing the wall member.

BRIEF DESCRIPTION OF THE DRAWINGS

Additional objects and advantages of the present invention will be more readily apparent from the following detailed description of a preferred embodiment with reference to the following drawings, in which.

DETAILED DESCRIPTION OF THE PREFERRED EMBODIMENT

A preferred embodiment of the present invention will be described with reference to the accompanying drawings.

Figure 1:
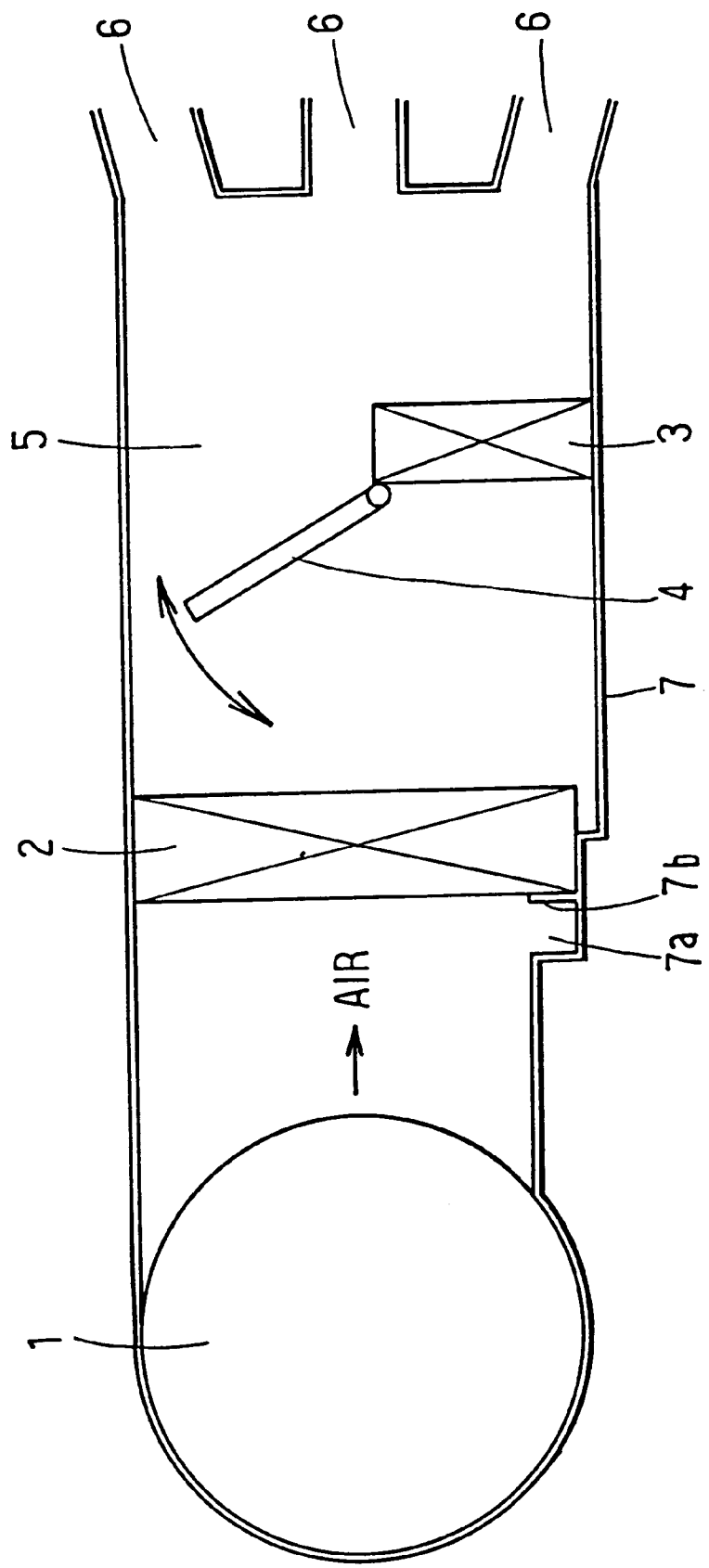
FIG. 1 is a schematic view showing a ventilation system of an automotive air conditioner according to the preferred embodiment of the present invention.

As shown in FIG. 1, an air conditioner includes a blower 1 for blowing air toward an air outlet 6, an evaporator 2 for cooling air passing therethrough, and a heater core 3 for heating air passing therethrough. As being known well, the blower 1 employs a centrifugal multi-blades fan. Outside air (i.e., air outside the vehicle) and inside air (i.e., air inside the vehicle) are introduced into an intake port of the blower 1 through an inside/outside air switching box (not shown).

The evaporator 2 of a refrigerating cycle is located at an outlet side of the blower 1. Refrigerant circulating within the evaporator 2 absorbs heat from air blown out from the blower 1 so that air is cooled. At a downstream air side of the evaporator 2, there is disposed the heater core 3 which heats air using hot water (i.e., engine cooling water) flowing from an engine. A cool air bypass passage 5 through which cool air having passed through the evaporator 2 bypasses the heater core 3 is provided, and the cool air bypass passage 5 is opened and closed by an air mixing door 4.

By adjusting an opening degree of the air mixing door 4, a ratio between an amount of air passing through the heater core 3 and an amount of air bypassing the heater core 3 is adjusted to control a temperature of air to be blown into a passenger compartment. After being controlled to a predetermined temperature, conditioned air is blown toward the passenger compartment from the air outlet 6 (e.g., face air outlet, foot air outlet, defroster air outlet) selected by a mode switching door system (not shown). The air conditioner further includes a resin case 7 forming an air passage.

The evaporator 2 and the case 7 which are main parts of the present invention will be described in detail with reference to FIGS. 2 through 4. The evaporator 2 is accommodated in the case 7 so that a core portion 21 is placed in a substantially vertical direction in FIG. 4 and cools air flowing substantially horizontally. The core portion 21 of the evaporator 2 includes a plurality of flat tubes 22 and corrugated fins 23 attached between each adjacent flat tubes 22 as shown in FIG. 4. Longitudinal side of each flat tube 22 is substantially in the vertical direction in FIG. 4.

The evaporator 2 shown in FIG. 4 is a laminated type evaporator. Each of the flat tubes 22 is formed by connecting two thin plates made of metal such as aluminum and each flat surface of the flat tube 22 is disposed in parallel with an air flow direction. After the flat tubes 22 and the corrugated fins 23 are laminated alternately in the lateral direction in FIG. 4, the laminated tubes and fins are held using the appropriate jigs and integrally brazed together in a furnace.

Bowl-shaped projections are provided integrally on the both upper and lower ends of the flat tube 22 to form an upper tank 22a and a lower tank 22b. The refrigerant is distributed to and collected from each flat tube 22 through the upper tank 22a and the lower tank 22b. In FIG. 4, the upper tank 22a and the lower tank 22b each have an upstream air side tank portion and a downstream air side tank portion.

A communicating hole (not shown) is provided to each upper tank 22a and lower tank 22b of each flat tube. Each upper tank 22a and lower tank 22b communicates with each other through the communicating hole in the lateral direction in FIG. 4.

A high-pressure liquid-phase refrigerant from a receiver (not shown) of the refrigerant cycle flows into a high-pressure refrigerant pipe 24. The high-pressure liquid-phase refrigerant in the pipe 24 is decompressed by a thermal expansion valve 25 and becomes in a low-pressure gas-liquid two-phase refrigerant. The low-pressure gas-liquid two-phase refrigerant is introduced into the upper tank 22a of the evaporator 2 through an inlet pipe 26. A gas-phased refrigerant evaporated from the evaporator 2 is collected into the lower tank 22b and flows into the thermal expansion valve 25 through an outlet pipe 27. The gas-phased refrigerant having passed through the thermal expansion valve 25 is introduced into an inlet of a compressor (not shown) through a low-pressure refrigerant pipe 28.

Figure 2:
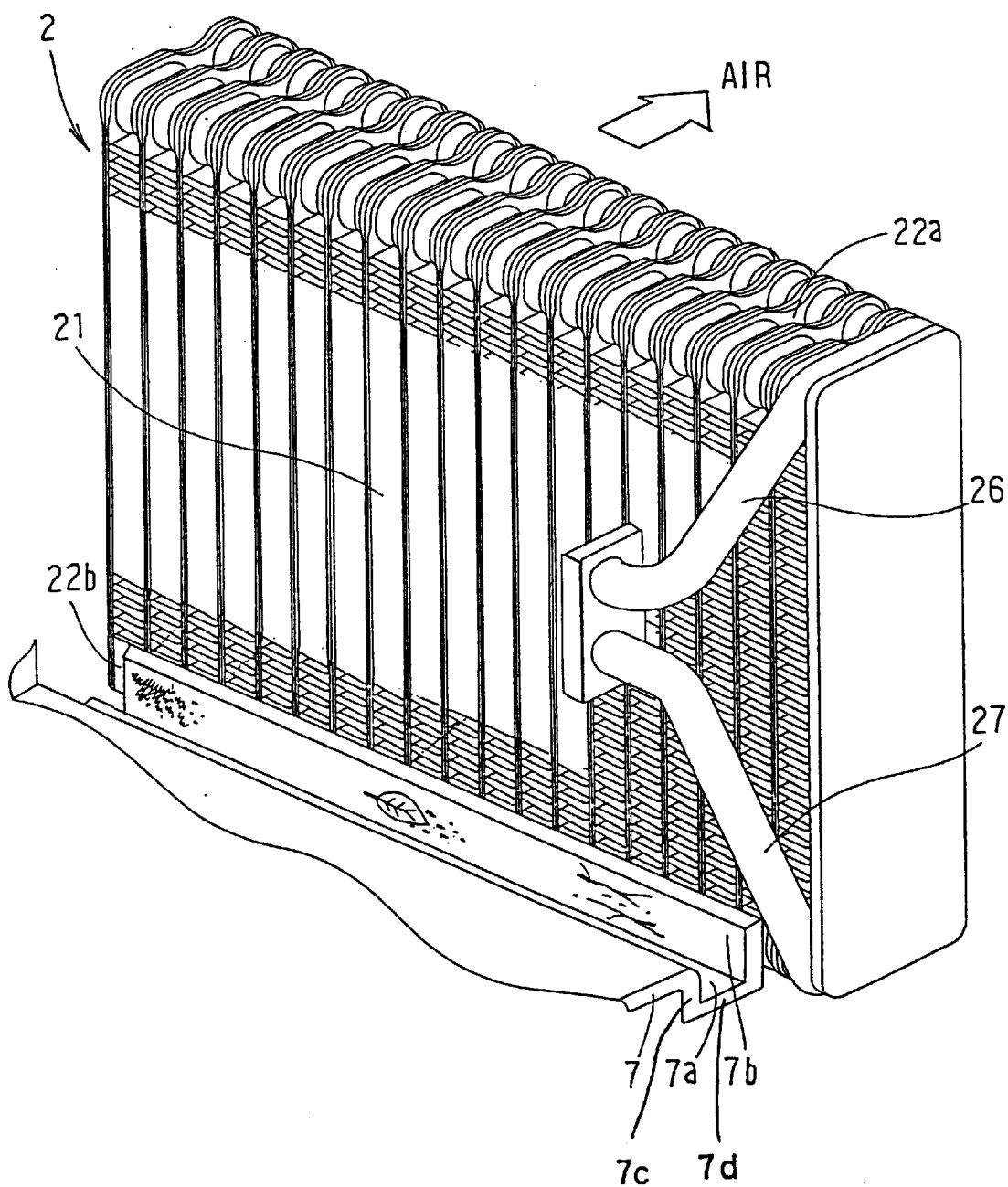
FIG. 2 is an enlarged perspective view showing an evaporator and a recess portion of a case for the air conditioner according to the preferred embodiment.
Figure 3:
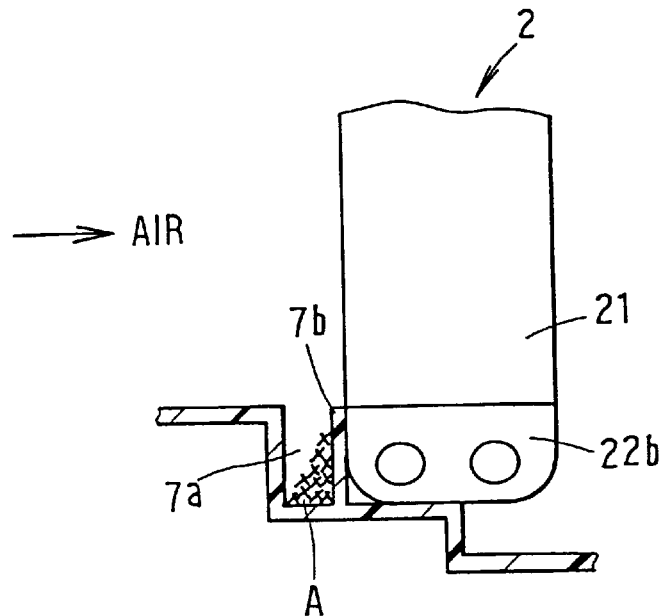
FIG. 3 is a partial cross-sectional view showing the evaporator disposed in the case having the recess portion.
Figure 5:
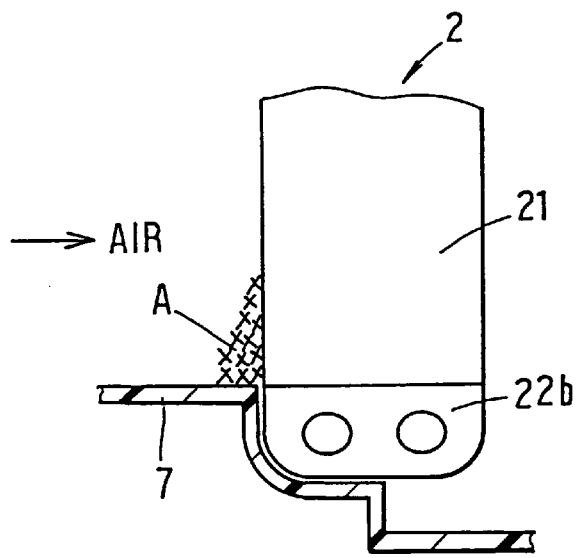
FIG. 5 is a partial cross-sectional view showing an evaporator disposed in a conventional case without providing a recess portion.
Figure 4:
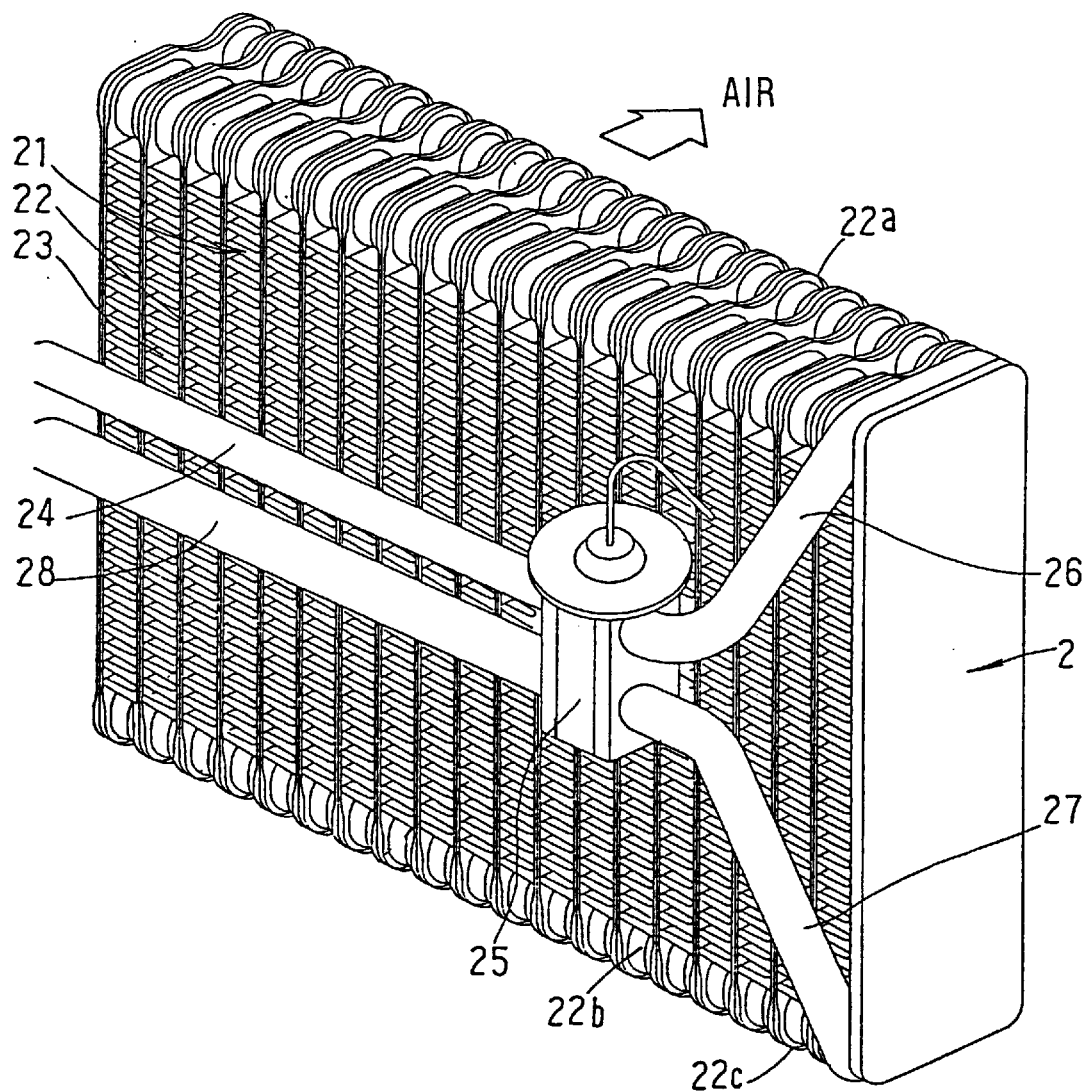
FIG. 4 is a perspective view showing the evaporator according to the preferred embodiment.

As shown in FIGS. 2 and 3, the case 7 has a recess portion 7a formed by a first vertical solid wall member 7b and a second vertical solid wall member 7c at an upstream air side of the lower tank 22b of the evaporator 2. The recess portion 7a is formed over the whole width (i.e., the length in the lateral direction) of the evaporator 2. Alien substances such as dirt and dust contained in air are deposited in the recess portion 7a when air passes through the evaporator 2.

A covering wall 7b extending upward from a bottom of the recess portion 7a is formed to cover the lower tank 22b of the evaporator 2 at an immediately upstream air side thereof. Because the case 7 is made of resin, both the recess portion 7a and the covering wall 7b can be integrally formed while forming the case 7. The height of the covering wall 7b is determined so that only the lower tank 22b can be covered completely. For example, the height of the covering wall 7b is 20 mm and the width of the recess portion 7a in the air flow direction is 15 mm.

An operation of the automotive air conditioner in this embodiment will briefly be described with reference to FIGS. 1 through 5.

When the blower 1 is turned ON, inside air and outside air is blown into the case 7 and passes between the flat tubes 22 and the corrugated fins 23 of the core portion 21 of the evaporator 2. The refrigerant circulating within the flat tube 22 absorbs heat from air to cool air passing through the evaporator 2. After the temperature of air has been controlled by adjusting the opening degree of the air mixing door 4, air flows toward the passenger compartment through the air outlet 6.

Air flowing into the evaporator 2 contains various alien substances such as dust, insects and dead leaves. When air passes through the evaporator 2, these alien substances collide with the flat tubes 22 or the corrugated fins 23 and fall to be deposited. In this embodiment, the recess portion 7a is provided at the upstream air side of the lower tank 22b of the evaporator 2, and the lower tank 22b is covered by the covering wall 7b at the immediately upstream air side of the lower tank 22b. It can prevent the alien substances from adhering to the lower tank 22b of the evaporator 2.

The alien substances fall into the recess portion 7a along the covering wall 7b and make the deposition A, as shown in FIG. 3. Therefore, it can prevent the alien substances from being mixed into air again. Thus, the corrosion of the lower tank 22b due to the direct adhesion of the alien substances is prevented.

As shown in FIG. 4, the lower tank 22b has a projection portion 22c forming a b razing surface. Because of these projection portions 22c, the lower tank 22b has an uneven surface. Therefore, a clearance between the bottom of the lower tank 22b and the case 7 may be formed, and air passing through the clearance is not cooled by the evaporator 2. In this embodiment, because the covering wall 7 covers the upstream air side of the lower tank 22b completely, it prevent air from passing through the clearance. Further, because the covering wall 7 covers only the lower tank 22b and does not cover the core portion 21, the cooling performance of the evaporator 2 is not affected.

Although the present invention has been fully described in connection with the preferred embodiment thereof with reference to the accompanying drawings, it is to be noted that various changes and modifications will become apparent to those skilled in the art.

For example, in the above-described embodiment, the evaporator 2 has the upper tank 22a and the lower tank 22b. However, the present invention may be applied to an evaporator which has only a lower tank and not has an upper tank. In the above-described embodiment, the covering wall 7b is integrally formed with the case 7. However, the covering wall 7b may be formed separately using some material such as resin and then attached to the recess portion 7a of the case 7 using some adhesive. The present invention may be applied to an air conditioner for various applications, not only for the vehicle application.

Such changes and modifications are to be understood as being included within the scope of the present invention as defined in the appended claims.

What is claimed is:

1. An air conditioner comprising:
   a case for forming an air passage;
   an evaporator, disposed in said case, for cooling air flowing in said air passage, said evaporator including
      a core portion having a plurality of flat tubes through which refrigerant flows and a plurality of fins each of which is connected between adjacent flat tubes, and
      a tank disposed at a lower end of said core portion, for distributing refrigerant into said flat tubes and collecting the refrigerant from said flat tubes;
   a first solid wall member for covering said tank at an immediately upstream air side of said tank, said wall member being integral with said case; and
   said case including a second solid wall member substantially equal in height to said first solid wall member for defining a recessed portion disposed immediately upstream air side of said first wall member, said recessed portion being open upwardly to define a bottom portion, said first wall member extending from said bottom portion to entirely cover only said tank.

2. The air conditioner according to claim 1, wherein:
   said first solid wall member and said second solid wall member are provided to extend generally perpendicular to said bottom portion of said recess portion.

3. The air conditioner according to claim 1, wherein said case is made of resin.

4. The air conditioner according to claim 1, wherein said bottom portion of said recessed portion is disposed below an inner bottom surface of said case at an upstream air side of said recessed portion.

5. The air conditioner according to claim 1, wherein:

said case has an upstream bottom surface extending approximately horizontally from said first solid wall member at an upstream air side from said first solid wall member;

said upstream bottom surface has a height approximately equal to a bottom end of said core portion; and said recessed portion is provided at a position lower than said upstream bottom surface.

6. The air conditioner according to claim 1, wherein said evaporator is a plate-laminated type in which said tubes and said tank are formed by laminating plural plates.

7. An air conditioner comprising:

a case for forming an air passage, said case having a bottom wall member; and an evaporator disposed in said case, for cooling air flowing in said air passage, said evaporator including a core portion having a plurality of flat tubes through which refrigerant flows and a plurality of fins each of which is connected between adjacent flat tubes, and a tank disposed at a lower end of said core portion, for distributing refrigerant into said flat tubes and collecting the refrigerant from said flat tubes, wherein:

said bottom wall member of said case includes a first flat surface on which said evaporator is disposed and from which a first solid wall member extends upwardly to only cover said tank on an immediately upstream air side, and a second flat surface being connected to said first flat surface by a second solid wall member, said second flat surface being above said first flat surface stepwisely, said second solid wall member being substantially equal in height to said first solid wall member; and said first solid wall member, said first flat surface and said second solid wall member define a recess portion opened upwardly.

8. The air conditioner according to claim 7, wherein said second wall member is substantially perpendicular to said second flat surface.

9. The air conditioner according to claim 7, wherein said first wall member is substantially perpendicular to said first flat surface.

10. The air conditioner according to claim 7, wherein said case is made of resin.

11. The air conditioner according to claim 7, wherein:

said second flat surface is disposed at an upstream air side from said recess portion, and has a height approximately equal to a bottom end of said core portion; and said recess portion is provided at a position lower than said second flat surface.

* * * * *